(12) United States Patent
Bator

(10) Patent No.: US 9,227,362 B2
(45) Date of Patent: Jan. 5, 2016

(54) BRAID WELDING

(75) Inventor: Zsolt Bator, Oroszlany (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 605 days.

(21) Appl. No.: 13/592,424

(22) Filed: Aug. 23, 2012

(65) Prior Publication Data

US 2014/0054214 A1 Feb. 27, 2014

(51) Int. Cl.
*B01D 33/21* (2006.01)
*B01D 39/00* (2006.01)
*B01D 63/02* (2006.01)
*B01D 69/00* (2006.01)
*B01D 63/06* (2006.01)
*B01D 67/00* (2006.01)
*B01D 29/46* (2006.01)
*B29C 65/08* (2006.01)
*B29D 28/00* (2006.01)
*D04H 3/073* (2012.01)
*D04C 1/02* (2006.01)
*D04C 3/06* (2006.01)
(Continued)

(52) U.S. Cl.
CPC .............. *B29C 65/08* (2013.01); *B29D 28/00* (2013.01); *D04C 1/02* (2013.01); *D04C 3/06* (2013.01); *D04H 3/073* (2013.01); *B29C 53/58* (2013.01); *B29C 65/081* (2013.01); *B29C 66/1122* (2013.01); *B29C 66/69* (2013.01); *B29C 66/8161* (2013.01); *B29C 66/81419* (2013.01); *B29C 66/81423* (2013.01); *B29C 66/81431* (2013.01); *B29C 66/9513* (2013.01); *B29C 66/9517* (2013.01); *B29L 2028/00* (2013.01)

(58) Field of Classification Search
CPC ........ B01D 69/08; B01D 69/02; B01D 63/02; B01D 2325/40; B01D 61/145
USPC ............................................. 210/500.23, 490
See application file for complete search history.

(56) References Cited

U.S. PATENT DOCUMENTS 2,747,649 A 5/1956 Reed
2,936,482 A 5/1960 Kilian
(Continued)

FOREIGN PATENT DOCUMENTS

CA 986422 3/1976
CA 2288316 5/2000
(Continued)

OTHER PUBLICATIONS

Caplan et al., Formation of microporous Teflon PFA membranes via thermally induced phase separation, Journal of Membrane Science, 130 (1997) p. 219-237.

(Continued)

*Primary Examiner* — Ana Fortuna
(74) *Attorney, Agent, or Firm* — Scott Pundsack; Borden Ladner Gervais LLP

(57) ABSTRACT

A tubular support for use with a hollow fiber membrane is made with an apparatus that comprises a forming machine and an ultrasonic welding machine. The apparatus may also include a coating nozzle for depositing a dope on the support. In operation, filaments are formed into a tubular structure in which the filaments cross each other in radial and circumferential directions, for example a braid. The filaments are ultrasonically welded together at intersections between them. The support is combined with a polymeric membrane wall to form a hollow fiber membrane.

2 Claims, 4 Drawing Sheets

(51) Int. Cl.
  B29C 65/00    (2006.01)
  B29L 28/00    (2006.01)
  B29C 53/58    (2006.01)

(56)            References Cited

U.S. PATENT DOCUMENTS

| | | | |
|---|---|---|---|
| 3,494,121 A | 2/1970 | Bohrer | |
| 3,547,721 A | 12/1970 | Dietzsch | |
| 3,567,666 A | 3/1971 | Berger | |
| 3,615,024 A | 10/1971 | Michaels | |
| 3,673,028 A | 6/1972 | Pearson | |
| 3,676,193 A | 7/1972 | Cooper et al. | |
| 3,705,070 A | 12/1972 | Kim | |
| 3,745,142 A | 7/1973 | Mahlman | |
| 3,816,231 A | 6/1974 | Marshall | |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |
| 4,029,265 A | 6/1977 | Piper | |
| 4,061,821 A | 12/1977 | Hayano et al. | |
| 4,115,492 A | 9/1978 | Mahoney et al. | |
| 4,247,498 A | 1/1981 | Castro | |
| 4,253,936 A | 3/1981 | Leysen et al. | |
| 4,274,539 A | 6/1981 | Rabeneck et al. | |
| 4,299,083 A | 11/1981 | Igel et al. | |
| 4,335,193 A | 6/1982 | Doi et al. | |
| 4,340,480 A | 7/1982 | Pall et al. | |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,631,128 A | 12/1986 | Coplan et al. | |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chau et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,032,282 A | 7/1991 | Linder et al. | |
| 5,034,129 A | 7/1991 | Ten Hove | |
| 5,066,401 A | 11/1991 | Muller et al. | |
| 5,139,529 A | 8/1992 | Seita et al. | |
| 5,143,312 A | 9/1992 | Baurmeister | |
| 5,151,191 A | 9/1992 | Sunaoka et al. | |
| 5,168,005 A | 12/1992 | Keating | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |
| 5,284,583 A | 2/1994 | Rogut | |
| 5,294,338 A | 3/1994 | Kamo et al. | |
| 5,303,550 A | 4/1994 | Setzer | |
| 5,328,610 A | 7/1994 | Rogut | |
| 5,332,498 A | 7/1994 | Rogut | |
| 5,336,298 A | 8/1994 | Quinn et al. | |
| 5,374,453 A | 12/1994 | Swei et al. | |
| 5,376,273 A | 12/1994 | Pacheco et al. | |
| 5,380,477 A | 1/1995 | Kent et al. | |
| 5,385,777 A | 1/1995 | Higuchi et al. | |
| 5,392,588 A | 2/1995 | Morrison | |
| 5,435,955 A | 7/1995 | Kamei et al. | |
| 5,470,659 A | 11/1995 | Baumgart et al. | |
| 5,472,607 A | 12/1995 | Mailvaganam et al. | |
| 5,474,680 A | 12/1995 | Eguchi | |
| 5,489,406 A | 2/1996 | Beck et al. | |
| 5,497,608 A | 3/1996 | Matsumoto et al. | |
| 5,547,756 A | 8/1996 | Kamo et al. | |
| 5,582,913 A | 12/1996 | Simons | |
| 5,637,385 A | 6/1997 | Mizuki et al. | |
| 5,651,888 A | 7/1997 | Shimizu et al. | |
| 5,656,167 A | 8/1997 | Martz | |
| 5,709,735 A | 1/1998 | Midkiff et al. | |
| 5,716,689 A | 2/1998 | Rogut | |
| 5,753,351 A | 5/1998 | Yoshida et al. | |
| 5,782,959 A | 7/1998 | Yang et al. | |
| 5,783,608 A | 7/1998 | Sugo et al. | |
| 5,804,128 A | 9/1998 | Ogata et al. | |
| 5,882,461 A | 3/1999 | Rogut | |
| 5,888,605 A | 3/1999 | Hachisuka et al. | |
| 5,914,039 A | 6/1999 | Mahendran et al. | |
| 5,972,501 A | 10/1999 | Ohmory et al. | |
| 6,015,495 A | 1/2000 | Koo et al. | |
| 6,024,872 A | 2/2000 | Mahendran et al. | |
| 6,048,641 A | 4/2000 | Ohmory et al. | |
| 6,077,376 A * | 6/2000 | Kataro et al. | 156/195 |
| 6,083,393 A | 7/2000 | Wu et al. | |
| 6,090,731 A | 7/2000 | Pike et al. | |
| 6,114,017 A | 9/2000 | Fabbricante et al. | |
| 6,127,433 A | 10/2000 | Sugo et al. | |
| 6,148,865 A * | 11/2000 | Head | 138/123 |
| 6,183,640 B1 | 2/2001 | Wang | |
| 6,245,239 B1 | 6/2001 | Cote et al. | |
| 6,264,044 B1 | 7/2001 | Meyering et al. | |
| 6,273,271 B1 | 8/2001 | Moya | |
| 6,280,791 B1 | 8/2001 | Meyering et al. | |
| 6,354,443 B1 | 3/2002 | Moya | |
| 6,354,444 B1 | 3/2002 | Mailvaganam et al. | |
| 6,454,943 B1 | 9/2002 | Koenhen | |
| 6,465,094 B1 | 10/2002 | Dugan | |
| 6,495,663 B1 | 12/2002 | Rothbard et al. | |
| 6,559,192 B2 | 5/2003 | Maccone et al. | |
| 6,562,879 B1 | 5/2003 | Hatsuda et al. | |
| 6,592,759 B2 | 7/2003 | Rabie et al. | |
| 6,635,204 B2 | 10/2003 | Tanaka et al. | |
| 6,746,627 B2 | 6/2004 | Niu et al. | |
| 6,792,744 B2 | 9/2004 | Feuerlohn et al. | |
| 6,802,971 B2 | 10/2004 | Gorsuch et al. | |
| 6,890,435 B2 | 5/2005 | Ji et al. | |
| 6,924,318 B2 | 8/2005 | Mischi et al. | |
| RE39,176 E | 7/2006 | Dutt | |
| 7,081,273 B2 | 7/2006 | Ji | |
| 7,165,682 B1 | 1/2007 | Ji | |
| 7,172,075 B1 | 2/2007 | Ji | |
| 7,185,597 B1 | 3/2007 | Phillips et al. | |
| 7,247,238 B2 | 7/2007 | Mullette et al. | |
| 7,267,872 B2 | 9/2007 | Lee et al. | |
| 7,306,105 B2 | 12/2007 | Shinada et al. | |
| 7,413,804 B2 | 8/2008 | Lee et al. | |
| 7,441,667 B2 | 10/2008 | Galvin et al. | |
| 7,563,376 B2 | 7/2009 | Oishi | |
| 7,776,214 B2 | 8/2010 | Saito et al. | |
| 7,807,221 B2 | 10/2010 | Shinada et al. | |
| 7,861,869 B2 | 1/2011 | Beckers et al. | |
| 7,909,177 B2 | 3/2011 | Lee et al. | |
| 2002/0046970 A1 | 4/2002 | Murase et al. | |
| 2002/0090690 A1 | 7/2002 | Eddleman et al. | |
| 2002/0111674 A1 | 8/2002 | Chouinard et al. | |
| 2002/0155289 A1 | 10/2002 | Cistone et al. | |
| 2003/0094409 A1 | 5/2003 | Minegishi et al. | |
| 2003/0098275 A1 | 5/2003 | Mahendran et al. | |
| 2003/0107150 A1 | 6/2003 | Hamanaka et al. | |
| 2003/0192826 A1 | 10/2003 | Wang et al. | |
| 2003/0197308 A1 | 10/2003 | Montoya | |
| 2004/0073300 A1 | 4/2004 | Chouinard et al. | |
| 2004/0078903 A1 | 4/2004 | Bruning et al. | |
| 2004/0136894 A1 | 7/2004 | Yoshizawa et al. | |
| 2005/0124249 A1 | 6/2005 | Uribarri | |
| 2005/0189292 A1 | 9/2005 | Ward et al. | |
| 2005/0205488 A1 | 9/2005 | Shinada et al. | |
| 2006/0000766 A1 | 1/2006 | Ji | |
| 2006/0175243 A1 | 8/2006 | Mahendran et al. | |
| 2007/0084794 A1 | 4/2007 | Morikawa et al. | |
| 2007/0262017 A1 | 11/2007 | Shinada et al. | |
| 2007/0293132 A1 * | 12/2007 | Arnason | 452/140 |

(56) References Cited

U.S. PATENT DOCUMENTS

| | | | |
|---|---|---|---|
| 2008/0023125 A1 | 1/2008 | Arnold et al. | |
| 2008/0210623 A1 | 9/2008 | McMahon et al. | |
| 2008/0221668 A1* | 9/2008 | Pinchuk et al. | 623/1.23 |
| 2008/0241451 A1 | 10/2008 | Beckers et al. | |
| 2008/0292823 A1 | 11/2008 | Lee et al. | |
| 2008/0305290 A1 | 12/2008 | Lee et al. | |
| 2009/0068428 A1 | 3/2009 | Shinoda et al. | |
| 2009/0314708 A1 | 12/2009 | Yeom | |
| 2010/0024631 A1 | 2/2010 | Lee et al. | |
| 2011/0114553 A1 | 5/2011 | Teramachi et al. | |
| 2012/0018371 A1* | 1/2012 | Cote | 210/500.23 |
| 2012/0097604 A1* | 4/2012 | Cote et al. | 210/500.23 |
| 2012/0156485 A1* | 6/2012 | Palinkas et al. | 428/365 |
| 2012/0164447 A1 | 6/2012 | Kohinata | |
| 2013/0153490 A1 | 6/2013 | Pedersen et al. | |
| 2013/0158007 A1 | 6/2013 | Mickle et al. | |
| 2013/0168007 A1 | 7/2013 | Cote et al. | |
| 2013/0233788 A1* | 9/2013 | Vizvardi et al. | 210/490 |

FOREIGN PATENT DOCUMENTS

| | | |
|---|---|---|
| CA | 2474625 | 8/2003 |
| CA | 2478445 | 9/2003 |
| CA | 2478831 | 9/2003 |
| CA | 2630418 | 6/2007 |
| CH | 507012 | 5/1971 |
| CZ | 286263 B6 | 2/2000 |
| DE | 4142417 | 6/1992 |
| DE | 10211051 | 10/2003 |
| EP | 0241995 | 10/1987 |
| EP | 0761292 A1 | 3/1997 |
| EP | 0819467 | 1/1998 |
| EP | 0998972 | 5/2000 |
| EP | 1193292 | 4/2002 |
| EP | 1236503 | 9/2002 |
| EP | 1424157 A1 | 6/2004 |
| EP | 1658889 A1 | 5/2006 |
| EP | 0998972 B1 | 4/2007 |
| EP | 2043766 B1 | 2/2010 |
| EP | 2301654 | 3/2011 |
| FR | 1511581 | 2/1968 |
| FR | 2616812 | 12/1988 |
| FR | 2336962 | 7/1997 |
| GB | 1325672 A | 8/1973 |
| GB | 1374704 | 11/1974 |
| GB | 2041821 | 9/1980 |
| HU | 0300443 A | 6/2003 |
| HU | 008058 T2 | 2/2010 |
| JP | 53-039982 | 9/1974 |
| JP | 52137026 | 11/1977 |
| JP | 53028084 | 3/1978 |
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 11348131 B2 | 12/1999 |
| JP | 2000-093768 | 4/2000 |
| JP | 2000288365 | 10/2000 |
| JP | 2001-062258 | 3/2001 |
| JP | 2003320584 A | 11/2003 |
| JP | 2008-114180 | 5/2008 |
| KR | 20040038473 A | 5/2004 |
| KR | 20110089621 A | 8/2011 |
| NL | 1010458 C2 | 4/2000 |
| TW | 200946323 A | 11/2009 |
| WO | WO 93/23153 | 11/1993 |
| WO | WO 99/01207 | 1/1999 |
| WO | 2009142279 | 11/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | 2005061081 | 7/2005 |
| WO | 2005082503 A1 | 9/2005 |
| WO | 2005113218 A1 | 12/2005 |
| WO | 2005118116 A1 | 12/2005 |
| WO | WO 2006053406 | 5/2006 |
| WO | WO 2006063426 | 6/2006 |
| WO | WO 2007116072 | 10/2007 |
| WO | WO 2008066340 | 6/2008 |
| WO | 2010062454 | 6/2010 |
| WO | WO 2010/081228 | 7/2010 |
| WO | 2010108285 A1 | 9/2010 |
| WO | WO 2010/108285 | 9/2010 |
| WO | WO 2010/148517 | 12/2010 |
| WO | 2012036935 | 3/2012 |
| WO | 2012/067380 A2 | 5/2012 |

OTHER PUBLICATIONS

Choi et al., Fabrication and characterization of multi-walled carbon nanotubes/polymer blend membranes, Journal of Membrane Science 284 (2006) p. 406-415.
Choi et al., Modification of Performances of Various Memranes Using MWNTs as a Modifier, Macromol. Symp. 2007, 249-250, p. 610-617.
English language abstact of JP 11-319519 to Nitto Denko Corp, published Nov. 24, 1999.
English language abstract of JP 04-265132 to UBE IND LTD, published Sep. 21, 1992.
English language abstract of JP 04265133 to UBE IND LTD, published Sep. 21, 1992.
English language abstract of JP 04293529 to UBE IND LTD, published Oct. 19, 1992.
English language abstract of JP 06-015152 to TOKUYAMA SODA CO LTD, published Jan. 25, 1994.
English language abstract of JP 06-246139 to DAINIPPON INK & CHEM INC, published Sep. 6, 1994.
English language abstract of JP 06246140 to DAINIPPON INK & CHEM INC, published Sep. 6, 1994.
English language abstract of JP 07-080263 to MITSUBISHI RAYON CO LTD, published Mar. 28, 1995.
English language abstract of JP 07-116483 to DAINIPPON INK & CHEM INC, published May 9, 1995.
English language abstract of JP 07157580 to KAWAMURA INST OF CHEM RES DAINIPPON INK & CHEM INC, published Jun. 20, 1995.

(56) References Cited

OTHER PUBLICATIONS

English language abstract of JP 08165396 to KURABE IND CO LTD, published Jun. 25, 1996.
English language abstract of JP 10-323546 to NITTO DENKO CORP, published Dec. 8, 1998.
English language abstract of JP 11-319519 to NITTO DENKO CORP published Nov. 24, 1999.
English language abstract of JP 2000-093768 to NOK CORP, published Apr. 4, 2000.
English language abstract of JP 2000288365 to TORARY IND INC, published Oct. 17, 2000.
English language abstract of JP 2001-062258, to Mitsubishi Rayon Co. Ltd, published 2001-Mar. 2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
PCT Search Report dated Jun. 14, 2010 issued in connection with PCT Application No. PCT/CA2010/000469 which was filed on Mar. 26, 2010.
English language abstract of JP 52082682 to Asahi Chemical Ind, published Jul. 11, 1997.
English language abstract of JP 52137026 to TOYOBO CO LTD, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to MITSUBISHI RAYON CO LTD, published Oct. 25, 1980.
English language abstract of JP 57005914 to MITSUBISHI RAYON CO LTD, published Jan. 12, 1982.
English language abstract of JP 57-028139 to ASAHI CHEM IND CO LTD, published Feb. 15, 1982.
English language abstract of JP 58-004810 to TOYOBO CO LTD, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to DAINIPPON INK & CHEM INC 'KAWAMURA INST OF CHEM RES, published Nov. 8, 1984.
English language abstract of JP 60137402 to MITSUBISHI RAYON CO LTD, published Jul. 22, 1985.
English language abstract of JP 60139815 to MITSUBISHI RAYON CO LTD, published Jul. 24, 1985.
English language abstract of JP 61-146811 to UBE IND LTD, published Jul. 4, 1986.
English language abstract of JP 62001404 to Mitsubishi Rayon Co, published Jan. 7, 1987.
English language abstract of JP 62019206 to DAINIPPON INK & CHEM INC, published Jan. 28, 1987.
English language abstract of JP 62045318 to DAINIPPON INK & CHEM INC, published Feb. 27, 1987.
English language abstract of JP 62079806 to UBE IND LTD, published Apr. 13, 1987.
English language abstract of JP 62-133190 to Toagosei Chem Ind Co Ltd, published Jun. 16, 1987.
English language abstract of JP 64-014315 to MITSUBISHI RAYON CO LTD, published Jan. 18, 1989.
Ramaswamy et al., Fabication of poly (ECTFE) membranes via thermally induced phase separation, Journal of Membrane Science, 210 (2002) p. 175-180.
Lin et al., Microporous PVDF membrane formation by immersion precipitation from water/TEP/PVDF system, Desalination, 145 (2002) p. 25-29.
Lloyd et al., Microporous membrane formation via thermally-induced phase separation. II. Liquid-liquid phase separation, Journal of Membrane Science, 64 (1991) p. 1-11.
Lloyd, Douglas R., Microporous membrane formation via thermally induced phase separation. I. Solid-liquid phase separation, Journal of Membrane Science, 52 (1990) p. 239-261.
Jie Liu, Pingli Li et al. Preparation of PET threads reinforced PVDF hollow fiber membrane, Desalination, vol. 249, Issue 2, 15 Dec. 2009, pp. 453-457.
Search Report and Written Opinion from PCT/US2011/063332 dated Jul. 31, 2012.
Search Report and Written Opinion from PCT/US2011/050479 dated Nov. 25, 2011.
Inoue Shoten KK, English language abstract of JP2003320584, published Nov. 11, 2003.
Sung Cheol, English language abstract of KR20110089621, published Aug. 9, 2011.
Guo-Chang, English language abstract of TW200946323, published Nov. 16, 2009.
Schunk Ultraschalltechnik GMGH, English language abstract of CZ286263, published Feb. 16, 2000.
Murata Manufacturing Co, English language abstract of JP11348131, published Dec. 21, 1999.
Tsujino, Jiromaru et al., Welding Of Flat Copper Braid Wire Specimens Using Ultrasonic Complex Vibration—Direct Machining of Terminal Parts On Flat Braided Wires, Ultrasonics Symposium, IUS 2008. IEEE, Nov. 2-5, 2008.
ELKE, English language abstract of EP1424157, published Jun. 2, 2004.
PCT Search Report dated Jun. 21, 2013 from PCT Application No. PCT/US2013/026979.
PCT Search Report and Written Opinion dated Mar. 28, 2013 from PCT Application No. PCT/US2012/065648.
PCT Search Report and Written Opinion dated May 13, 2013 from PCT Application No. PCT/US2013/025110.
Search Report and Written Opinion from corresponding PCT Application No. PCT/US2013/053891 dated Oct. 16, 2013.
Novelty Search Report dated Jan. 8, 2015 from Hungarian Application No. P1400398.
Solvay, English language abstract of HU0300443 published Jun. 28, 2003.
Vlaamse Instelling Voor Technologisch Onderzoek, English language abstract of EP2043766 (Equivalent of HU008058), Jun. 28, 2003.

* cited by examiner

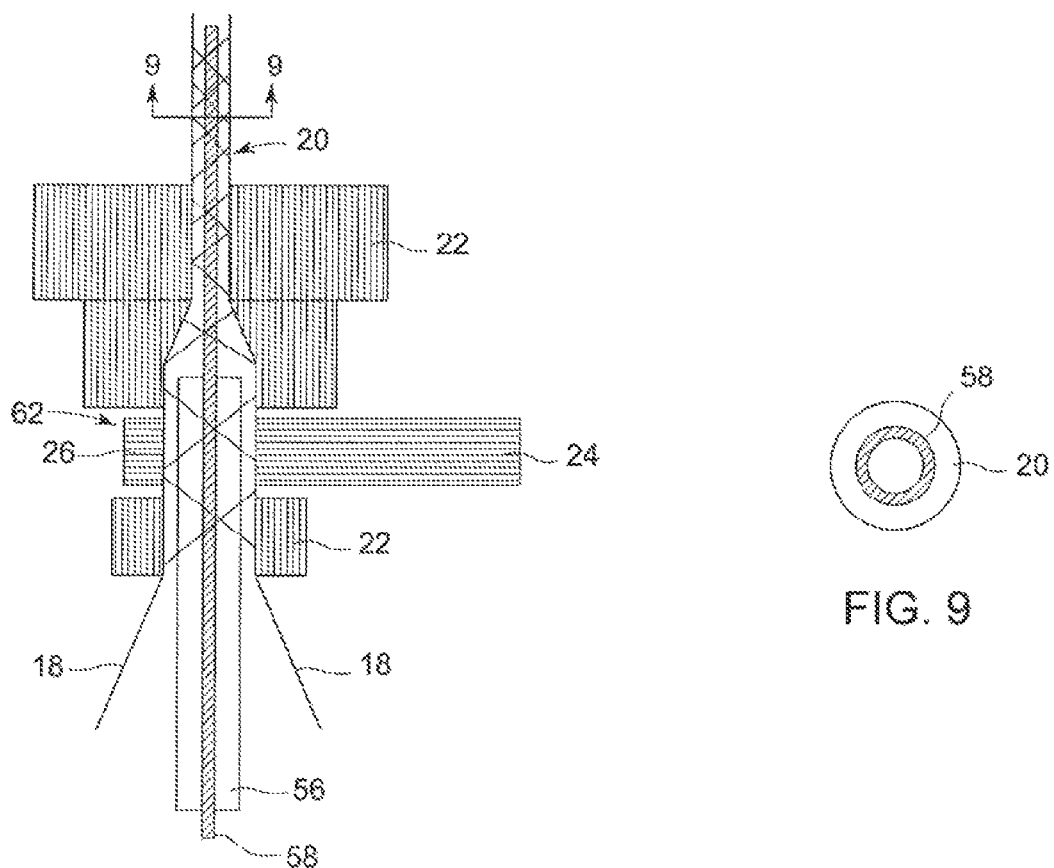
FIG. 8
FIG. 9
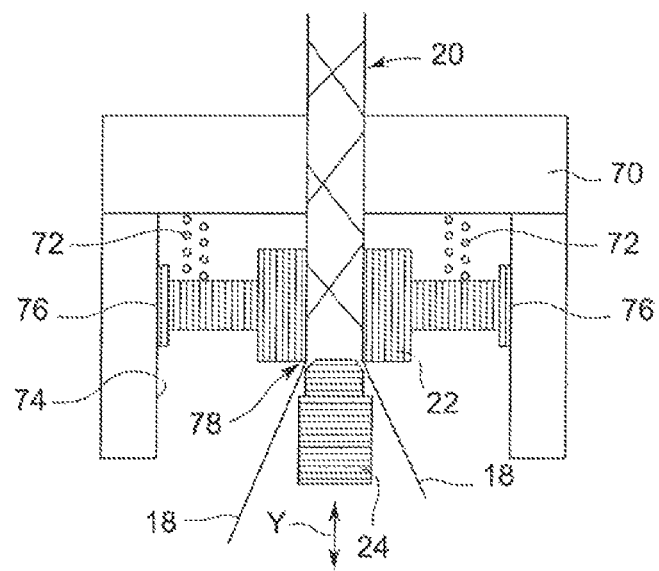
FIG. 10

BRAID WELDING

FIELD

This specification relates to hollow fiber membranes and to an apparatus and method for making supporting structures for hollow fiber membranes.

BACKGROUND

U.S. Pat. No. 6,354,444 describes an asymmetric membrane comprising a tubular polymeric film supported on a tubular braid. The braid is flexible yet strong enough to withstand flexing and stretching when the membrane is used for microfiltration (MF) or ultrafiltration (UF). The braid is prefabricated according to specified physical parameters such that the braid has a wall thickness in the range of 0.2 mm to 1.0 mm and limited air permeability. The tubular polymeric film has a thickness of less than 0.2 mm and is formed by casting a dope on the braid while the braid is fed through a coating nozzle. Although the braid is self-supporting, the coating nozzle includes a rounding orifice to ensure that the braid is completely round before the dope is coated over it. The tubular polymeric film is supported on the outer circumferential surface of the braid without the braid being embedded in the tubular polymeric film. The coated braid travels through a coagulation tank in which the dope is converted into the polymeric film.

International Publication Number WO 2010/148517 describes various methods of making non-braided textile-reinforced hollow fiber membranes. Some of the methods provide a reinforcing structure that includes filaments extending around the circumference of the membrane but without the filaments being part of a braided or woven structure. Some of the reinforcing structures also include longitudinal filaments. The reinforcing structures are embedded in the membrane wall. The membranes have a ratio of inside-to-outside diameters of 0.5 or more.

INTRODUCTION

The following is intended to introduce the reader to the detailed description to follow and not to limit or define the claims.

This specification describes an apparatus and method for manufacturing a supporting structure for a hollow fiber membrane. The apparatus comprises a tubular support forming device and an ultrasonic welding device. The method comprises the steps of arranging a set of filaments into a tubular supporting structure and sonically welding the filaments together at points of intersection between the filaments.

This specification describes a method and apparatus for making a hollow fiber membrane. The apparatus comprises an apparatus for making a support as described above and a coating nozzle. The method comprises the steps described above for making a support and a step of incorporating the support into a hollow fiber membrane.

This specification also describes a hollow fiber membrane. The membrane comprises a polymeric wall and a tubular supporting structure. The tubular supporting structure comprises filaments that cross each other in both circumferential and radial directions. The filaments are welded together at points of intersection between them.

BRIEF DESCRIPTION OF THE DRAWINGS

FIG. 8 is a cross-sectional schematic illustration of an ultrasonic welding machine and gathering guide having another configuration in which the welding machine is positioned within an aperture of the gathering guide, and an optional hollow mandrel.

FIG. 9 is a cross-sectional view taken along line 9-9 of FIG. 8.

FIG. 10 is a cross-sectional schematic illustration of an ultrasonic welding machine and gathering guide having another configuration in which part of the gathering guide functions as part of the welding machine.

DETAILED DESCRIPTION

Braid supported membranes made generally as described in U.S. Pat. No. 6,354,444 are used in ZeeWeed™ immersed membrane modules made by GE Water & Process Technologies. These modules are used, in particular, in membrane bioreactors (MBR). Despite vigorous agitation of the membranes in MBRs, there are essentially no incidences of fiber breakage with ZeeWeed modules. A braid with fewer filaments could still produce a sufficiently strong membrane. However, the physical parameters described in U.S. Pat. No. 6,354,444 are chosen, at least in part, so that the braid will be self-supporting and sufficiently dense to allow a membrane forming dope to be coated on the braid.

In this specification, the words "tubular supporting structure" (alternatively called a "support") refer to a foraminous, or at least porous, structure formed of filaments that cross each other in both circumferential and radial directions. The support might, or might not, be self-supporting but can at least be manipulated into a generally tubular shape with a longitudinal bore. The support may be, for example, a woven, braided or knit tube.

Figure 1:
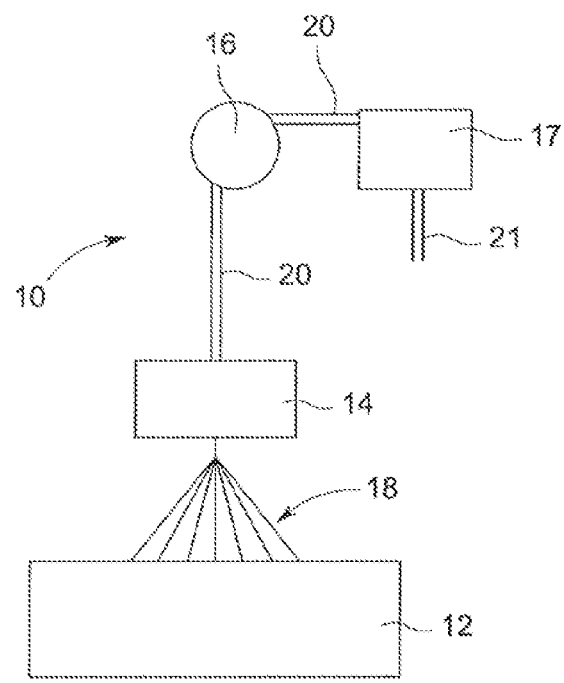
FIG. 1 is a schematic illustration of an apparatus for making a tubular supporting structure and a supported hollow fiber membrane.

FIG. 1 depicts an apparatus 10 for manufacturing a support 20 that is useful in the manufacture of hollow fiber membranes. The apparatus 10 comprises a support forming machine 12 and an ultrasonic welding machine 14. The support 20 may be, for example, a knit, woven or braided support. The support forming machine 20 may be, for example, a knitting machine, braiding machine or weaving machine. The support is made up of filaments 18 that have been arranged by the support forming machine 12. The filaments 18 may be monofilaments or multifilaments such as tows or yarns. The filaments 18 travel through the support forming machine 12 and the ultrasonic welding machine 14. The ultrasonic welding machine 14 welds the filaments 18 together at at least some points of intersection between them. Optionally, a rotating spool 16 may be provided to draw the filaments 18 through the apparatus 10. Tension applied to the support 20 by the spool 16 helps keep the support 20 round with an open longitudinal bore while the filaments 18 are welded.

Optionally, a coating nozzle 17 may be provided in line with the welding machine 14 to deposit a membrane forming dope on or around the support 20 as the support 20 is made. A coated support 21 passes from the coating nozzle 17 to a coagulation bath (not shown) to form a hollow fiber membrane suitable, for example, for microfiltration or ultrafiltration processes. The coating nozzle 17 is positioned after the ultrasonic welding machine 14 and before or after the spool 16.

Optionally, the support forming machine 12 may braid the filaments 18 into a braided support 20. For example, the filaments 18 may be braided together on a vertical or horizontal tubular braiding machine, with a vertical machine preferred. The tubular braiding machine includes a track plate with intertwining tracks and multiple bobbin carriers. The bobbin carriers carry bobbins that are loaded with the filaments 18 and travel along the tracks in either a clockwise or counter-clockwise direction. As the bobbin carriers travel along the tracks, the filaments 18 are drawn towards a gathering guide 22 (as shown for example in FIG. 3). The gathering guide 22 is positioned above the center of the track plate. The gathering guide 22 receives the filaments 18 and assists in forming a braided support 20.

The speed of bobbin carrier and the speed at which the braided filaments 18 are drawn through the gathering guide 22 can determine the pattern and angle of the filaments 18 within a braided support 20. For example, a braided support 20 may have about 20 to 100 picks (crosses per inch). The cylindrical wall of the braided support 20 may have a thickness from about 0.1 mm to about 0.7 mm, preferably in the range from about 0.3 to 0.5 mm. The bore may have an inner diameter in the range from about 0.25 mm to 2.3 mm.

Figure 2:
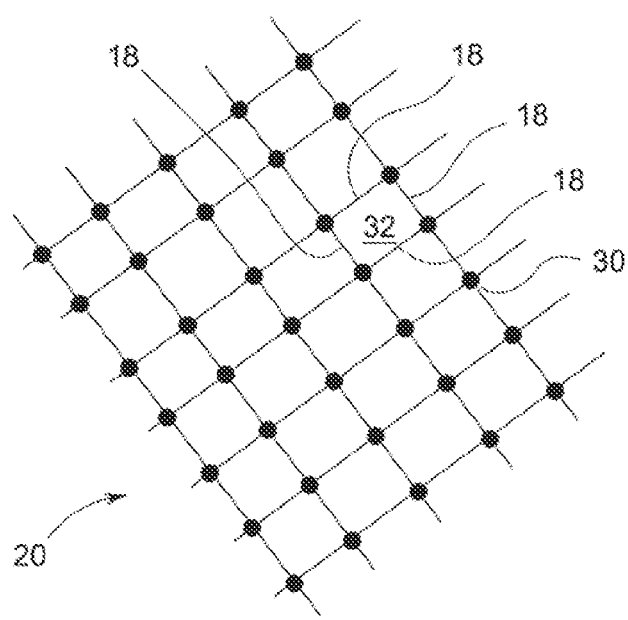
FIG. 2 is a schematic illustration of a portion of a braided support.

FIG. 2 shows a portion of a tubular wall of a braided support 20 laid flat. The wall has various intersections 30 at the points where two or more filaments 18 cross each other. The tension in the filaments 18 during the braiding process may compress the filaments 18 at each intersection 30. Segments of the filaments 18 between the intersections 30 define voids 32 in the wall of the support 20. The voids 32 may be uniformly or non-uniformly shaped. The voids 32 may optionally be small enough to inhibit substantial penetration of a dope that is deposited on the braided support 20 by the coating nozzle 17. Alternatively, the voids 32 may be larger such that the filaments 18 becomes partially or completely embedded in the dope.

Figure 3:
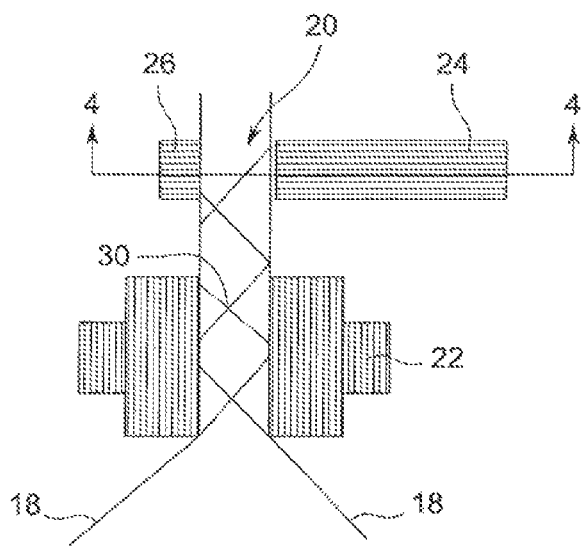
FIG. 3 is a cross-sectional schematic illustration of an ultrasonic welding machine and a gathering guide, the gathering guide being part of a machine for arranging filaments into a tubular supporting structure, wherein the gathering guide is located ahead of the welding machine.

FIG. 3 depicts a cross-sectional view of the gathering guide 22 of a tubular braiding machine and parts of an ultrasonic welding machine 14 that is positioned above, or after, the gathering guide 22. Optionally, the distance between the gathering guide 22 and the ultrasonic welding machine 14 may be variable.

Figure 4:
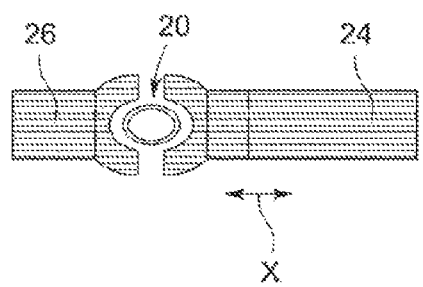
FIG. 4 is a cross-sectional view of a sonotrode head of the ultrasonic welding machine of FIG. 3 taken along line 4-4 of FIG. 3.

The ultrasonic welding machine 14 comprises a counter tool 26 and a sonotrode 24. The braided support 20 is drawn from the gathering guide 22 to pass between opposing surfaces of the counter tool 26 and the sonotrode 24. The counter-tool 26 is fixed in place and may also be referred to as an anvil or nest. The sonic welding machine 14, and optionally an associated controller (not shown), oscillates the sonotrode 24 towards and away from the counter tool 26 with an amplitude of about 10 to 150 μm at a frequency between about 15 or 20 to 70 kHz. The oscillation of the sonotrode 24 imparts acoustic energy into the filaments 18. Preferably, the sonotrode 24 oscillates in a plane that is perpendicular to the braided support 20, for example as shown by arrow X in FIG. 4. Optionally, the sonotrode 24 may oscillate in a plane that is parallel to the braided support 20.

The filaments 18 are made of, or optionally coated with or comprise, a material that is susceptible to ultrasonic welding. Acoustic energy imparted by the oscillating sonotrode 24 causes the material to temporarily transition from a solid-phase into a melt-phase. While in the melt phase, portions of the material of one filament 18 may consolidate with portions of the material of another filament 18 at some or all of the intersections 30 between the filaments 18. Portions of the filaments 18 at the intersections 30 later transitions into a consolidated solid phase such that some or all of the intersections 30 becoming welded joints. The welded joints may increase the structural stability or strength of the support 20. Alternatively, fewer filaments 18 may be used to produce a support 20 of equal strength or stability relative to a similar support without welded filaments 18.

The compression at each intersection 30, which is caused by tension applied during the braiding process, may accentuate the effects of the acoustic energy at the intersections 30. After a given portion of the braided support 20 has passed through the ultrasonic welding machine 14, the acoustic energy no longer affects the materials of the filaments 18 and the materials of the filaments 18 transition back to the solid phase.

The apparatus 10 may operate in a continuous process. The filaments 18 are drawn under tension through the forming machine 12. The forming machine 12 assembles the filaments 18 such that the filaments 18 form the support 20 as the filaments 18 pass through the gathering guide 22. One or more materials of the filaments 18 are melted by the ultrasonic welding machine 14, which causes materials from one filament 18 to consolidate with materials from another filament 18. Optionally, the ultrasonic welding machine 14 may melt the materials of the filaments 18 prior to or while gathering the filaments 18 to form the support 20. The welded support 20 is drawn from the ultrasonic welding machine 14 and may be stored for later use. Optionally, the welded support 20 may pass directly through the coating apparatus 17 to receive a membrane dope in an additional continuous, in-line, membrane forming step.

In variations of the ultrasonic welding machine 14, the shape of the opposing surfaces of the counter tool 26 and the sonotrode 24 may be configured to alter the focus of the acoustic energy. For example, one or both of the opposing surfaces may have a raised ridge that focuses the acoustic energy towards a smaller area of the support 20. The raised ridge may also cause a localized increase in compression of the filaments 18, which may localize and accentuate the effect of the acoustic energy. In another variation, one opposing surface has a raised ridge and the other opposing surface has two laterally displaced raised ridges that receive the opposing raised ridge between them. Alternatively, the opposing surfaces may be more shaped to disperse the acoustic energy over a larger flat area.

Figure 5:
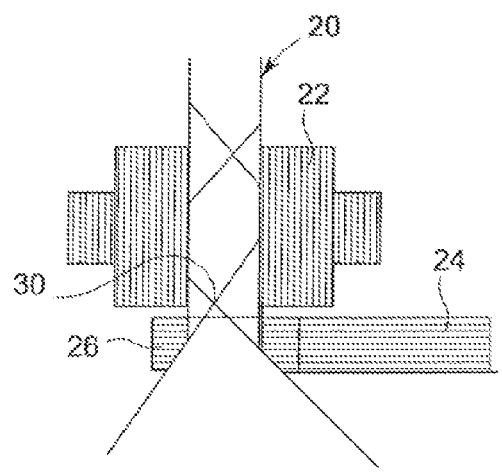
FIG. 5 is a cross-sectional schematic illustration of another arrangement of an ultrasonic welding machine and gathering guide in which the welding machine is ahead of the gathering guide.

FIG. 5 shows an optional arrangement for the apparatus 10 in which the ultrasonic welding machine 14 is located before the gathering guide 22. As the filaments 18 are braided and pass over the edges 60 of the counter tool 26 and the sonotrode 24 that are closest to the forming machine 12, the acoustic energy from the oscillating sonotrode 24 is imparted into the material of the filaments 18. Optionally, edges 60 may be chamfered or radiused to assist with gathering the filaments 18 and forming the braided support 20. In this option, the materials of the filaments 18 transition to the melt phase prior to the final positioning of the intersections 30. The filaments 18 remain in the melt phase as the filaments 18 move towards their final positions relative to each other. The filaments transition to the solid phase after the intersections 30 reach their final positions to create welded intersections 30.

Optionally, the ultrasonic welding machine 14 may have a sonotrode 24 in the form of a ring, and the filaments 18 may pass through the open center of the ring before or after they enter the gathering guide 22 and form the support 20. The filaments 18 may be pressed against the ring shaped sonotrode by a bore guide, may be pulled against the ring shaped sonotrode by tension, or may merely pass by the sonotrode.

In another option, the apparatus 10 may include a bore guide, for example as will be described below in relation to FIGS. 6 and 7. The bore guide may support the filaments 18 to help keep the bore of the braided support 20 open until the braided support 20 has passed through the sonic welding machine 14. A bore guide may also be used to place filaments 18 against a sonotrode or counter tool.

Figure 6:
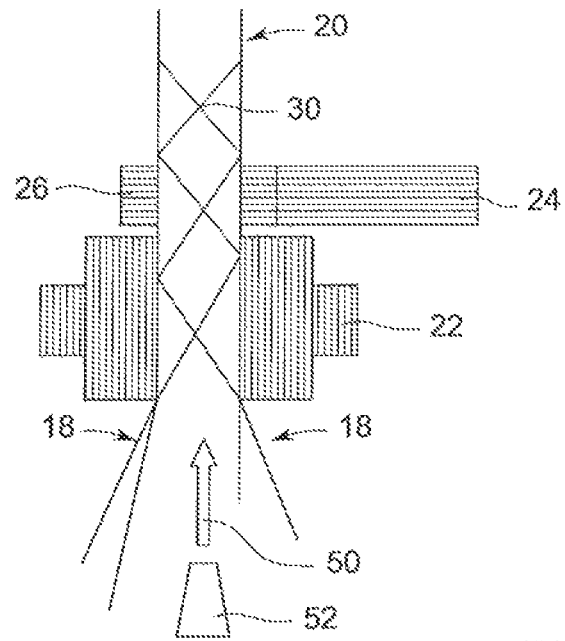
FIG. 6 is a cross-sectional schematic illustration of an ultrasonic welding machine and gathering guide generally as show in FIG. 3 with an optional compressed gas nozzle.

FIG. 6 shows one option in which the bore guide is a stream of a fluid, such as gas 50 (shown by the arrow in FIG. 5). The stream of gas 50 may be a compressed gas, preferably compressed air, which is provided by a nozzle 52. Nozzle 52 is positioned between the tubular braiding machine 12 and the sonic welding machine 14. The stream of gas 50 flows coaxially with the support 20 and into the longitudinal bore and helps keep the bore of the support 20 open.

Figure 7:
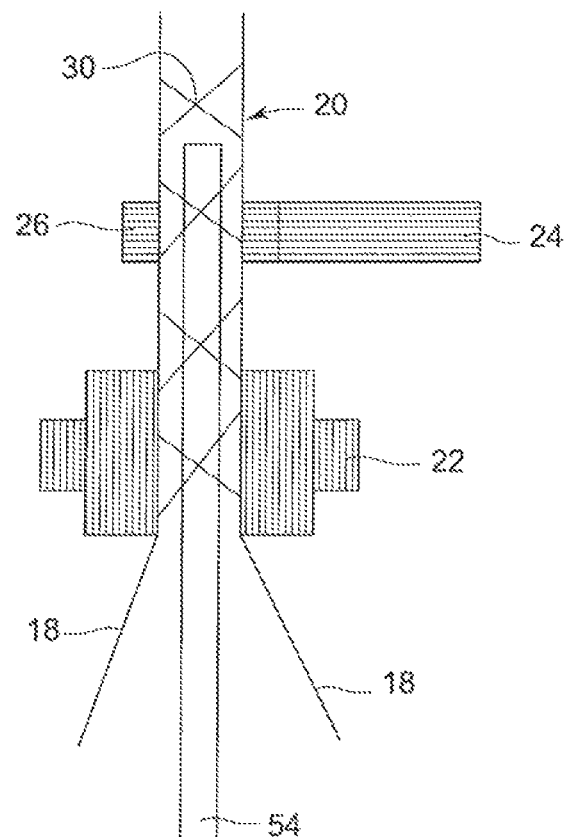
FIG. 7 is a cross-sectional schematic illustration of an ultrasonic welding machine and gathering guide generally as show in FIG. 3 with an optional mandrel.

FIG. 7 depicts another option in which the bore guide is a mandrel 54. The mandrel 54 may be in the form of a pin, a spring pin, a tube, a pipe, a rod, a needle or any other body that will provide structural support to help keep the bore of the support 20 open. The mandrel 54 may extend from the forming machine 12 through the gathering guide 22 so that the filaments 18 are braided at least in part around the longitudinal axis of the mandrel 54. The mandrel 54 may also extend through the gathering guide 22 and through the sonotrode 24 to support to the braided support 20 as it travels through the sonic welding machine 14.

FIG. 8 depicts another option in which the bore guide comprises a hollow mandrel 56. The hollow mandrel 56 may be used to admit a bore material 58 into the support 20. The hollow mandrel 56 may be positioned between the forming machine 12 (not shown in FIG. 8) and the position of the sonotrode 24 or extend from the forming machine 12. The hollow mandrel 56 may extend through the gathering guide 22 and through the ultrasonic welding machine 14. The support 20 forms at least in part around the outer surface of the hollow mandrel 56. The bore material 58 is introduced through the hollow mandrel 56 at the line speed and becomes enclosed within the braided support 20. The bore material 58 can be any material, fluid or solid, that is desirable to have enclosed within the braided support 20 during production, for example to help form the bore of the resulting membrane or support the filaments 18, or permanently, for example to form a composite membrane. This bore material 58 may be removed during a later processing step, for example before or after coating the support 20. In the example shown in FIG. 9, the bore material 58 is a hollow tube of polyvinyl acetate used to help support the filaments 18 and form the bore of the resulting membrane. The tube of polyvinyl acetate remains inside the support 20 until the dope is coagulated but is dissolved out of the membrane before the membrane is put in use.

As shown in FIG. 8, the ultrasonic welding machine 14 may be positioned within an aperture 62 of the gathering guide 22. The aperture 62 is large enough to house the counter tool 26 and the sonotrode 24. Optionally, the dimensions of the aperture 62 permit placing the counter tool 26 and the sonotrode 24 in a range of different positions within the aperture 62.

FIG. 10 depicts another option for the apparatus 10 in which the gathering guide 22 is supported in a housing 70 by springs 72. Optionally, the gathering guide 22 may contact an inner surface 74 of the housing 70 to ensure that movement of the gathering guide 22 is coaxial with the travel direction of the braided support 20. As a further option, the gathering guide 22 may have one or more low friction surfaces 76 that contact the inner surface 74. Preferably, the gathering guide 22 has three or more spaced apart low friction surfaces 76 that contact the inner surface 74.

As shown in FIG. 10, the sonotrode 24 is positioned below the gathering guide 22 in line with the longitudinal axis of the support 20. The sonotrode 24 oscillates along the longitudinal axis of the support 20 towards and away from the lower edge of the gathering guide 22 as indicated by arrows Y. In this option, the gathering guide 22 acts as a non-fixed countertool. The biasing force of the springs 72 is directed towards the sonotrode 24 so that the spring 72 press against the filaments 18 as they pass through a gap 78 between the sonotrode 24 and the gathering guide 22. The resulting compression may accentuate the influence of the acoustic energy on the materials of the filaments 18. The amount of compression at the gap 78 may be adjusted by selecting appropriate springs 72 or adjusting their mounting positions. The lower edge of the gathering guide 22 is preferably chamfered or radiused to avoid cutting the filaments 18 as they pass over it. The upper edge of the sonotrode 24 may be given a complementary shape. The filaments fly over the upper edge of the sonotrode 24 without necessarily touching it. Providing a narrow gap 78 helps reduce the possibility of tangled or stray filaments 18 in the support 20.

The methods and devices described above provide alternative means of making a support for a hollow fiber membrane or a hollow fiber membrane. In some cases, the welded support may provide improved dimensional stability or strength relative to a support of similar denier that is not welded. In some cases, welding the support may reduce the incidence of stray filaments protruding from the intended inner or outer surface of the support.

Additional useful details regarding, for example, filaments, braiding machines, coating nozzles, membrane dopes and membrane forming techniques are described in U.S. Pat. No. 6,354,444 and International Publication Number WO 2010/148517. U.S. Pat. No. 6,354,444 and International Publication Number WO 2010/148517 are incorporated herein by this reference to them.

This written description uses examples to disclose the invention and also to enable any person skilled in the art to practice the invention. The scope of the invention is defined by the claims, and may include other examples that occur to those skilled in the art.

The invention claimed is:
1. A hollow fiber membrane comprising:
   a plurality of filaments forming a braided tubular support, and
   a polymeric membrane wall attached to the tubular support,
   wherein the filaments cross each other in both radial and circumferential directions,
   and wherein the filaments are ultrasonically welded together at one or more intersections where the filaments cross each other.

2. The hollow fiber membrane of claim 1 wherein the membrane wall has pores in the microfiltration or ultrafiltration range.

\* \* \* \* \*